(12) United States Patent
Oh et al.

(10) Patent No.: US 12,166,251 B2
(45) Date of Patent: Dec. 10, 2024

(54) METHOD FOR MANUFACTURING POLYMER ELECTROLYTE MEMBRANE FOR FUEL CELLS AND POLYMER ELECTROLYTE MEMBRANE FOR FUEL CELLS MANUFACTURED THEREBY

(71) Applicants: Hyundai Motor Company, Seoul (KR); Kia Motors Corporation, Seoul (KR)

(72) Inventors: Jong Kil Oh, Gyeonggi-do (KR); Sae Hoon Kim, Gyeonggi-do (KR); Bo Ki Hong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 165 days.

(21) Appl. No.: 16/942,001

(22) Filed: Jul. 29, 2020

(65) Prior Publication Data
US 2021/0305612 A1 Sep. 30, 2021

(30) Foreign Application Priority Data
Mar. 26, 2020 (KR) ........................ 10-2020-0036582

(51) Int. Cl.
*H01M 8/1053* (2016.01)
*H01M 8/1067* (2016.01)
(Continued)

(52) U.S. Cl.
CPC ....... *H01M 8/1053* (2013.01); *H01M 8/1067* (2013.01); *H01M 8/1081* (2013.01);
(Continued)

(58) Field of Classification Search
CPC ............. H01M 8/1053; H01M 8/1067; H01M 8/1081; H01M 2300/0094
See application file for complete search history.

(56) References Cited

U.S. PATENT DOCUMENTS 5,342,494 A 8/1994 Shane et al.
2004/0043283 A1* 3/2004 Cipollini ............. H01M 8/1007
429/465
(Continued)

FOREIGN PATENT DOCUMENTS

KR 10-0897104 B 5/2009
KR 10-2018-0047394 A 5/2018
(Continued)

OTHER PUBLICATIONS

"A Study on the Caracteristics of Membrane-Electrode Assemblies (MEAs) and a Bipolar Direct Methanol Fuel Cell (DMFC) under Ambient Condition", Feb. 2004.

*Primary Examiner* — James Lee
(74) *Attorney, Agent, or Firm* — Fox Rothschild LLP

(57) ABSTRACT

Disclosed are a method for manufacturing a polymer electrolyte membrane for fuel cells in which a plurality of porous reinforcement films and ionomer layers are continuously disposed or stacked, and a polymer electrolyte membrane for fuel cells manufactured thereby. The polymer electrolyte membrane for fuel cells includes the porous reinforcement films, thus having excellent mechanical stiffness and improved physical durability. Further, the polymer electrolyte membrane for fuel cells includes an ionomer layer including a catalyst for decomposing peroxide configured to block gas crossover and may thus minimize performance degradation due to gas crossover and prevent an electrical short, and the polymer electrolyte membrane for fuel cells makes it easy to adjust the position of the ionomer layer in the electrolyte membrane in the thickness direction and may thus effectively mitigate gas crossover.

7 Claims, 3 Drawing Sheets

(51) Int. Cl.
*H01M 8/1081* (2016.01)
*H01M 8/10* (2016.01)

(52) U.S. Cl.
CPC ............... *H01M 2008/1095* (2013.01); *H01M 2300/0082* (2013.01); *H01M 2300/0094* (2013.01)

(56) References Cited

U.S. PATENT DOCUMENTS

| | | | | |
|---|---|---|---|---|
| 2008/0107803 | A1* | 5/2008 | Kwon | H01M 8/1004 427/115 |
| 2009/0220844 | A1* | 9/2009 | Suzuki | H01M 8/0289 429/492 |
| 2013/0130133 | A1* | 5/2013 | Jiang | H01M 8/0289 977/734 |
| 2017/0018780 | A1 | 1/2017 | Vincent et al. | |
| 2020/0243887 | A1* | 7/2020 | Suzuki | H01M 8/106 |

FOREIGN PATENT DOCUMENTS

| | | |
|---|---|---|
| KR | 10-1877753 B | 7/2018 |
| KR | 10-1900772 B | 9/2018 |

* cited by examiner

METHOD FOR MANUFACTURING POLYMER ELECTROLYTE MEMBRANE FOR FUEL CELLS AND POLYMER ELECTROLYTE MEMBRANE FOR FUEL CELLS MANUFACTURED THEREBY

CROSS-REFERENCE TO RELATED APPLICATION

This application claims under 35 U.S.C. § 119 (a) the benefit of priority to Korean Patent Application No. 10-2020-0036582 filed on Mar. 26, 2020, the entire contents of which are incorporated herein by reference.

TECHNICAL FIELD

The present invention relates to a method for manufacturing a polymer electrolyte membrane for fuel cells which includes one or more of reinforcement films so as to improve mechanical stiffness and to mitigate chemical degradation and a polymer electrolyte membrane for fuel cells manufactured thereby.

BACKGROUND

As fuel cells for vehicles, a polymer electrolyte membrane fuel cell (PEMFC) is most commonly used at present. In order to allow the polymer electrolyte membrane fuel cell to normally exhibit high output performance of tens of kW or more under various vehicle driving conditions, the polymer electrolyte membrane fuel cell must be stably operable within a wide current density range.

The polymer electrolyte membrane fuel cell has been used as a stack assembled by stacking unit cells so as to satisfy a demanded output level. In the unit cell, gas diffusion layers (GDLs) and gaskets are stacked on outer surfaces of a membrane electrode assembly (MEA), i.e., the outer surfaces of the MEA on which a cathode and an anode are located, and bipolar plates (or separators) having flow fields formed therein to supply reaction gas (hydrogen serving as a fuel and oxygen or air serving as an oxidizer) and to pass cooling water are provided outside the GDLs. Hundreds of these unit cells are stacked, and end plates to support the unit cells are coupled to the outermost portions of the stack.

Electrochemical reactions to generate electricity of the fuel cell occur in the MEA including an electrolyte membrane and the electrodes, i.e., the anode and the cathode. In the electrochemical reactions in the fuel cell, hydrogen supplied to the anode of the fuel cell, which is an oxidation electrode, is separated into protons and electrons through a Hydrogen Oxidation Reaction (HOR), as given in Reaction Formula [1], and then the protons are moved to the cathode, which is a reduction electrode, through the membrane, and the electrons are moved to the cathode through an external circuit. The protons and the electrons react with oxygen gas supplied from the outside in the cathode through an Oxygen Reduction Reaction (ORR), as given in Reaction Formula [2], to produce electricity and heat and simultaneously to produce water as a by-product.

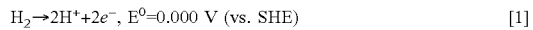
$$H_2 \rightarrow 2H^+ + 2e^-, \quad E^0 = 0.000 \text{ V (vs. SHE)} \qquad [1]$$

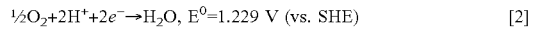
$$\tfrac{1}{2}O_2 + 2H^+ + 2e^- \rightarrow H_2O, \quad E^0 = 1.229 \text{ V (vs. SHE)} \qquad [2]$$

Here, $E^0$ is a standard electrode potential, and SHE is a standard hydrogen electrode.

Regions which exhibit the electrochemical performance of the fuel cell are broadly classified into three regions, namely: i) an activation loss region resulting from an electrochemical reaction rate loss, ii) an ohmic loss region resulting from ionic resistance in the polymer electrolyte membrane and electrical contact resistance at an interface between the respective parts, and iii) a mass transport loss region (also referred to as a concentration loss region) resulting from the limited mass transport capabilities of the reaction gases.

Therefore, attempts to reduce the thickness of the electrolyte membrane so as to reduce the ionic resistance of the membrane and to improve the performance of the fuel cell have continually been made. Hydrogen supplied to the anode and oxygen supplied to the cathode must be separated by the polymer electrolyte membrane, but, in case of a thin electrolyte membrane, gas crossover, in which gas passes through the polymer electrolyte membrane and is moved to the opposite electrode, may seriously occur. That is, $H_2$ crossover, in which hydrogen supplied to the anode crosses over to the cathode, or $O_2$ crossover, in which oxygen supplied to the cathode crosses over to the anode may occur. Such crossover facilitates generation of hydrogen peroxide in the electrolyte membrane, and hydrogen peroxide produces oxygen-containing radicals, such as a hydroxyl radical (·OH) and a hydroperoxyl radical (·OOH). These radicals attack the fluorine-containing sulfonic acid-based electrolyte membrane, thereby causing chemical degradation of the membrane and consequently reducing durability of the fuel cell.

Because the mechanical stiffness of the thin electrolyte membrane is poor, when the fuel cell is operated for a long time, the electrolyte membrane may become damaged and thus cause serious problems, such as an electrical short of the unit cells. Then, the fuel cell is not capable of being normally operated anymore, and thus fails. Particularly, in order to supply water to the inside of the electrolyte membrane in the membrane electrode assembly of the fuel cell, humidification (also referred to as hydration) must be performed. Further, since the fuel cell is generally operated at a high temperature of 60° C. or greater and dehydration is repeatedly carried out due to heat generation caused by electrochemical reactions, repetitive dry-wet cycling occurs in the membrane electrode assembly. Wrinkled deformation may occur due to repetitive shrinkage and swelling of the electrolyte membrane under this dry-wet cycling condition, and thus, in order to maintain durability of the membrane electrode assembly of the fuel cell, robustness of the electrolyte membrane is very important.

Therefore, research on a method for manufacturing a polymer electrolyte membrane which may improve physical or chemical stiffness and mitigate chemical degradation is required now.

SUMMARY

In preferred aspects, provided are a method for manufacturing a polymer electrolyte membrane for fuel cells which includes a plurality of porous reinforcement films and a polymer electrolyte membrane for fuel cells manufactured thereby.

In one preferred aspect, a method for manufacturing a polymer electrolyte membrane for fuel cells includes an ionomer layer including a catalyst for decomposing peroxide such that the position of the ionomer layer is adjustable, and a polymer electrolyte membrane for fuel cells may be manufactured thereby.

In one preferred aspect, a method for manufacturing a polymer electrolyte membrane for fuel cells which allows ionomer layers provided at both ends of the electrolyte membrane to include an ionomer having a low glass transition temperature and a polymer electrolyte membrane for fuel cells may be manufactured thereby.

The term "ionomer" as used herein refers to a polymeric material or resin that includes ionized groups attached (e.g. covalently bonded) to the backbone of the polymer as pendant groups. Preferably, such ionized groups may be functionalized to have ionic characteristics, e.g., cationic or anionic. Exemplary ionomer may suitably include one or more polymers selected from the group consisting of a fluoro-based polymer, a perfluorosulfone-based polymer, a benzimidazole-based polymer, a polyimide-based polymer, a polyetherimide-based polymer, a polyphenylene sulfide-based polymer, a polysulfone-based polymer, a polyethersulfone-based polymer, a polyetherketone-based polymer, a polyether-etherketone-based polymer, a polyphenylquinoxaline-based polymer and a polystyrene-based polymer.

In one aspect, provided is a method for manufacturing a polymer electrolyte membrane for fuel cells. The method may include forming a first ionomer layer by applying a first ionomer dispersion, disposing a first reinforcement film on the first ionomer layer, forming a second ionomer layer by applying a second ionomer dispersion to the first reinforcement film, disposing a second reinforcement film on the second ionomer layer, forming a third ionomer layer by applying a third ionomer dispersion to the second reinforcement film thereby forming a multilayer membrane including the first ionomer layer, the first reinforcement film, the second ionomer layer, the second reinforcement film, and the third ionomer layer, and drying the multilayer membrane.

The disposing of the first reinforcement film, the formation of the second ionomer layer and the disposing of the second reinforcement film may be continuously performed.

Each of coating thicknesses of the first, second and third ionomer dispersions may be of about 20 to 500 μm.

In the drying of the multilayer membrane, the multilayer membrane may be dried at a temperature of about 60 to 200° C.

Further, in one aspect, provided is a polymer electrolyte membrane for fuel cells including a first ionomer layer, a first reinforcement film disposed on the first ionomer layer, a second ionomer layer disposed on the first reinforcement film, a second reinforcement film disposed on the second ionomer layer, and a third ionomer layer disposed on the second reinforcement film.

The second ionomer layer may include a catalyst for decomposing peroxide.

The catalyst for decomposing peroxide may include one or more selected from the group consisting of a catalytic metal and a supported catalyst in which the catalytic metal is supported on a carbon-based carrier.

A position of the second ionomer layer may be adjusted by controlling thicknesses of the first reinforcement film and the second reinforcement film.

The second ionomer layer may be located in an area, in which peroxide is produced, by controlling the thicknesses.

A thickness of the first reinforcement film may be of about 1 to 20 μm and a thickness of the second reinforcement film may be of about 1 to 10 μm.

The first reinforcement film may be located close to an anode.

Each of thicknesses of the first, second and third ionomer layers may be of about 1 to 50 μm.

Each of porosities of the first and second reinforcement films may be of about 50 to 95%.

Glass transition temperatures of the first ionomer and the third ionomer may be less than a glass transition temperature of the second ionomer.

Other aspects and various embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
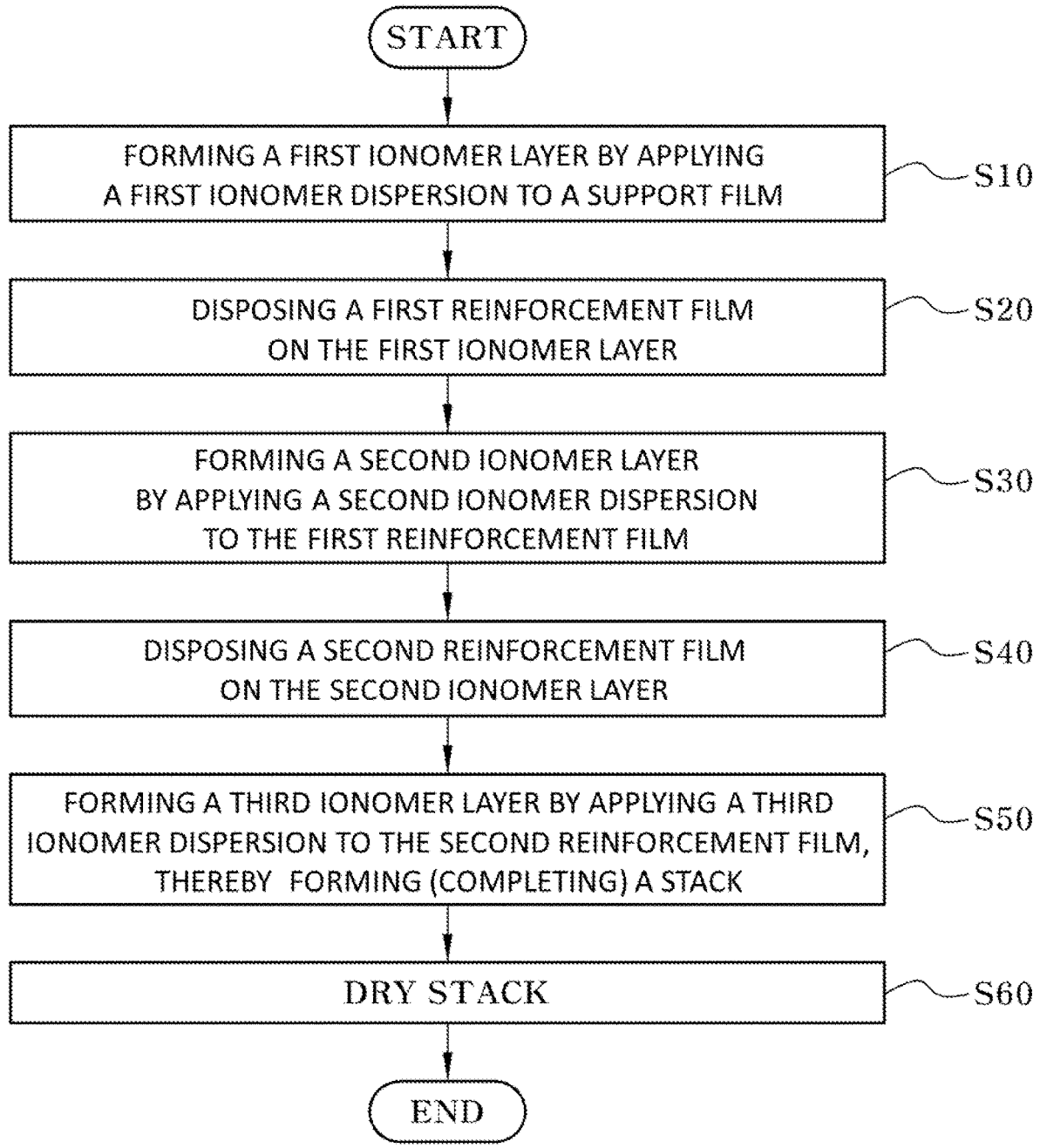
FIG. 1 shows an exemplary method for manufacturing an exemplary polymer electrolyte membrane for fuel cells according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawings.

DETAILED DESCRIPTION

Hereinafter reference will be made in detail to various embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments within the spirit and scope of the invention as defined by the appended claims.

In the following description of the embodiments, the same elements are denoted by the same reference numerals even though they are depicted in different drawings. In the drawings, the dimensions of structures are exaggerated compared to the actual dimensions thereof, for clarity of description. In the following description of the embodiments, terms, such as "first" and "second", may be used to describe various elements but do not limit the elements. These terms are used only to distinguish one element from other elements. For example, a first element may be named a second element and similarly the second element may be named the first element, without departing from the scope and spirit of the invention. Singular expressions may encompass plural expressions, unless they have clearly different contextual meanings.

In the following description of the embodiments, terms, such as "including", "having", will be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same. In addition, it will be understood that, when a part, such as a layer, a film, a region or a plate, is said to be "on" another part, the part may be located "directly on" the other part or other parts may be interposed between the two parts. In the same manner, it will be understood that, when a part, such as a layer, a film, a region or a plate, is said to be "under" another part, the part may be located "directly under" the other part or other parts may be interposed between the two parts.

All numbers, values and/or expressions representing amounts of components, reaction conditions, polymer compositions and blends used in the description are approximations in which various uncertainties in measurement generated when these values are acquired from essentially different things are reflected and thus, it will be understood that they are modified by the term "about". Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, it will be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise.

In the following description of the embodiments, it will be understood that, when the range of a variable is stated, the variable includes all values within the stated range including stated end points of the range. For example, it will be understood that a range of "5 to 10" includes not only values of 5, 6, 7, 8, 9 and 10 but also arbitrary subranges, such as a subrange of 6 to 10, a subrange of 7 to 10, a subrange of 6 to 9, and a subrange of 7 to 9, and arbitrary values between integers which are valid within the scope of the stated range, such as 5.5, 6.5, 7.5, 5.5 to 8.5, and 6.5 to 9. Further, for example, it will be understood that a range of "10% to 30%" includes not only all integers including values of 10%, 11%, 12%, 13%, . . . 30% but also arbitrary subranges, such as a subrange of 10% to 15%, a subrange of 12% to 18%, and a subrange of 20% to 30%, and arbitrary values between integers which are valid within the scope of the stated range, such as 10.5%, 15.5%, and 25.5%.

Method for Manufacturing Polymer Electrolyte Membrane for Fuel Cells

FIG. 1 shows a flowchart showing an exemplary method for manufacturing an exemplary polymer electrolyte membrane for fuel cells according to an exemplary embodiment of the present invention. The method may include forming a first ionomer layer by applying a first ionomer dispersion to a support film (S10), disposing a first reinforcement film on the first ionomer layer (S20), forming a second ionomer layer by applying a second ionomer dispersion to the first reinforcement film (S30), disposing a second reinforcement film on the second ionomer layer (S40), forming a third ionomer layer by applying a third ionomer dispersion to the second reinforcement film (S50) so as to form a multilayer membrane including the first ionomer layer, the first reinforcement film, the second ionomer layer, the second reinforcement film, and the third ionomer layer, and drying the multilayer membrane (S60). The disposing of the first reinforcement film (S20), the formation of the second ionomer layer (S30) and the disposing of the second reinforcement film (S40) may be continuously performed.

In the formation of the first ionomer layer (S10), the first ionomer layer may be formed by applying the first ionomer dispersion to the support film.

The support film according to an exemplary embodiment of the present invention may be a film which may be generally used in the art to which the present invention pertains, for example, be a film including one or more selected from the group consisting of polytetrafluoroethylene (PTFE), poly(ethylene terephthalate) (PET), poly(butylene terephthalate) (PBT), poly(trimethylene terephthalate) (PTT), poly(ethylene naphthalate) (PEN), polymethylpentene (PMP), polypropylene (PP) and polyimide (PI). Preferably, the supporting film may suitably include polytetrafluoroethylene (PTFE) having excellent releasability, without being limited to a specific kind.

A first ionomer included in the first ionomer dispersion according to an exemplary embodiment of the present invention is not limited to a specific ionomer as long as it serves as a binder which fixes an electrode and the first reinforcement film to each other and serves as a transport path which may transport protons generated by an anode to a cathode. The first ionomer dispersion may be a dispersion in which an ionomer in powder form is sufficiently agitated in a solvent so as to be dispersed in the solvent. The ionomer included in the ionomer dispersion may be a conventional ionomer which may be used in the present invention, for example, include one or more selected from the group consisting of a perfluorinated sulfonic acid (PFSA)-based ionomer and a hydrocarbon-based ionomer. The ionomer may suitably include a perfluorinated sulfonic acid (PFSA)-based ionomer having excellent proton conductivity and long-term stability, without being limited to a specific kind. Further, the solvent may be a conventional solvent which may be used in the present invention by those skilled in the art, for example, be at least one selected from the group consisting of isopropyl alcohol (IPA), n-propyl alcohol (nPA) and ethyl alcohol, deionized water or a mixture thereof, and is not limited to specific components.

Further, the glass transition temperature $T_g$ of the first ionomer included in the first ionomer layer may be less than the glass transition temperature $T_g$ of a second ionomer included in the second ionomer layer. The electrolyte membrane according to an exemplary embodiment of the present invention and electrodes may be disposed or stacked and then hot-pressing may be performed, thereby manufacturing a membrane electrode assembly for fuel cells. Here, in order to increase interfacial adhesion between the electrodes and the electrolyte membrane, hot-pressing must be performed at a temperature higher than the glass transition temperatures of the ionomers adjacent to the interfaces between the electrodes and the electrolyte membrane. Therefore, when the glass transition temperature of the ionomer located on the outer surface of the electrolyte membrane is low, the interfacial adhesion between the electrode and the electrolyte membrane may be improved, and thus, performance degradation due to electrode detachment may be mitigated. Moreover, a thermal bonding temperature may be lowered, and thus, damage to the electrode due to heat and performance reduction due to excessive crystallization of the ionomer and thermal degradation may be prevented.

The first ionomer dispersion according to an exemplary embodiment of the present invention may be applied to the support film using a conventional method which may be used in the present invention, for example, using one or more method selected from the group consisting of bar coating, comma coating, gravure coating, slot-die coating, screen printing, spray coating and combinations thereof, and preferably, using slot-die coating having excellent processability, without being limited to a specific method.

The coating thickness of the first ionomer dispersion may be of about 20 to 500 μm, or particularly of about 50 to 200 μm. When the coating thickness of the first ionomer dispersion is less than about 20 μm, it may be difficult for the first reinforcement film to be sufficiently impregnated with the first ionomer dispersion in the disposing (stacking) of the first reinforcement film on the first ionomer layer (S20), and the first ionomer layer may have an excessively small thickness and thus reduce adhesion between the electrolyte membrane and the electrode. Further, when the coating thickness of the first ionomer dispersion is greater than about 500 μm, the coated ionomer dispersion may flow without maintaining the shape thereof. Moreover, the thickness of the electrolyte membrane is increased, and thus performance of the fuel cell may be reduced due to an increase in ionic resistance of the electrolyte membrane.

In the disposing (stacking) of the first reinforcement film (S20), the first reinforcement film may be disposed or stacked on the first ionomer layer formed by applying the first ionomer dispersion to the support film.

The first reinforcement film according to an exemplary embodiment of the present invention may be a porous reinforcement film, and is not limited to a specific porous reinforcement film as long as it serves to provide a transport path which may transport protons generated by the anode to the cathode. The first reinforcement film may be a conventional porous reinforcement film which may be used in the present invention, for example, include one or more selected from the group consisting of polytetrafluoroethylene (PTFE), poly(ethylene terephthalate) (PET), polybenzoxazole (PBO), polyethylene (PE), polypropylene (PP) and polyimide (PI), or may suitably include polytetrafluoroethylene (PTFE) having excellent long-term stability, without being limited to a specific kind.

The first reinforcement film according to an exemplary embodiment of the present invention may be disposed or stacked on the first ionomer layer using a conventional method which may be used in the present invention by those skilled in the art, for example, using a roll laminating method or a sheet laminating method, or particularly, by using the roll laminating method having excellent processability and productivity, without being limited to a specific method.

In the formation of the second ionomer layer (S30), the second ionomer layer may be formed by applying the second ionomer dispersion to the disposed or stacked first reinforcement film.

The second ionomer included in the second ionomer dispersion according to an exemplary embodiment of the present invention is not limited to a specific ionomer as long as it serves as a binder which can fix the second reinforcement film and the first reinforcement film and serves as a transport path which may transport protons generated by the anode to the cathode. The second ionomer dispersion may be a dispersion in which an ionomer in powder form is sufficiently dispersed in a solvent, the second ionomer included in the second ionomer dispersion may be a conventional ionomer which may be used in the present invention, and components included in the second ionomer may be the same as or different from the components included in the first ionomer.

Particularly, the polymer electrolyte membrane including the second ionomer according to an exemplary embodiment of the present invention includes a plurality of porous reinforcement film layers, thus being capable of realizing excellent mechanical stiffness and greatly improved mechanical durability.

According to another exemplary embodiment of the present invention, the second ionomer dispersion may include a catalyst for decomposing peroxide. In this case, the catalyst for decomposing peroxide is not limited to a specific catalyst as long as it may decompose peroxide produced due to hydrogen or oxygen crossover and thus prevent an electrical short in the polymer electrolyte membrane. When the second ionomer dispersion includes the catalyst for decomposing peroxide, the second ionomer dispersion may be a dispersion in which an ionomer in powder form and the catalyst for decomposing peroxide are sufficiently agitated in a solvent so as to be dispersed in the solvent. Components included in this ionomer may be the same as or different from the components included in the first ionomer. Further, the catalyst for decomposing peroxide may be a conventional catalyst which may be used in the present invention by those skilled in the art, for example, include at least one selected from the group consisting of a catalytic metal and a supported catalyst in which the catalytic metal is supported on a carbon-based carrier, and particularly, the catalytic metal may be platinum (Pt), a platinum alloy including platinum and one or more selected from the group consisting of gold, palladium, rhodium, iridium, ruthenium, tin, molybdenum, cobalt and chromium, or a mixture including platinum and at least one selected from the group consisting of gold, palladium, rhodium, iridium, ruthenium, tin, molybdenum, cobalt and chromium, and preferably, be a carbon-supported platinum catalyst having excellent peroxide degradability, without being limited to specific components. That is, in the present invention, when the second ionomer dispersion includes the catalyst for decomposing peroxide, the electrolyte membrane may employ the ionomer layer including the catalyst for decomposing peroxide, which may prevent gas crossover, thereby minimizing performance degradation due to gas crossover, preventing an electrical short in the electrolyte membrane, and making it easy to adjust the position of the ionomer layer in the electrolyte membrane in the thickness direction so as to effectively mitigate gas crossover.

Further, the glass transition temperature $T_g$ of the second ionomer included in the second ionomer layer may be higher than the glass transition temperatures $T_g$ of the first and third ionomers included in the first and third ionomer layers.

When the membrane electrode assembly for fuel cells is finally manufactured by disposing (stacking) the electrolyte membrane according to an exemplary embodiment of the present invention and the electrodes and then performing hot-pressing, in order to increase interfacial adhesion between the electrodes and the electrolyte membrane, hot-pressing must be performed at a temperature higher than the glass transition temperatures of the ionomers adjacent to the interfaces between the electrodes and the electrolyte membrane. Therefore, when the glass transition temperature of the ionomer located inside the electrolyte membrane is high, the interfacial adhesion between the electrode and the electrolyte membrane may be improved, and thus, performance degradation due to electrode detachment may be mitigated. Moreover, the thermal bonding temperature may be lowered, and thus, damage to the electrode due to heat and performance reduction due to excessive crystallization of the ionomer and thermal degradation may be prevented.

A method for applying the second ionomer dispersion according to an exemplary embodiment of the present invention to the first reinforcement film may be the same as or different from the method for applying the first ionomer dispersion to the support film.

Here, the coating thickness of the second ionomer dispersion may be of about 20 to 500 μm, or particularly of about 0 to 200 μm. When the coating thickness of the second ionomer dispersion is less than about 20 μm, it may be difficult for the second reinforcement film to be sufficiently impregnated with the second ionomer dispersion in the disposing (stacking) of the second reinforcement film on the second ionomer layer (S40). Further, when the coating thickness of the second ionomer dispersion is greater than about 500 μm, the coated ionomer dispersion may flow without maintaining the shape thereof. Moreover, the thickness of the electrolyte membrane may be increased, and thus performance of the fuel cell may be reduced due to an increase in ionic resistance of the electrolyte membrane.

In the disposing (stacking) of the second reinforcement film (S40), the second reinforcement film may be disposed (or stacked) on the second ionomer layer formed by applying the second ionomer dispersion to the first reinforcement film.

The second reinforcement film according to an exemplary embodiment of the present invention is a porous reinforcement film, and is not limited to a specific porous reinforcement film as long as it serves to provide a transport path which may transport protons generated by the anode to the cathode. The kind of the second reinforcement film and a method for disposing (stacking) the second reinforcement film on the second ionomer layer may be the same as or different from those in the first reinforcement film.

Particularly, the multilayer membrane may be manufactured by continuously performing the disposing (stacking) of the first reinforcement film (S20), the formation of the second ionomer layer (S30) and the disposing (stacking) of the second reinforcement film (S40). Here, the disposing (stacking) of the first reinforcement film (S20), the formation of the second ionomer layer (S30) and the disposing (stacking) of the second reinforcement film (S40) may be temporally continuously performed. Further, this may mean that the disposing (stacking) of the first reinforcement film (S20), the formation of the second ionomer layer (S30) and the disposing (stacking) of the second reinforcement film (S40) are continuously performed, unlike a conventional method in which they are subjected to other processes, such as thermal bonding and drying.

Further, when the polymer electrolyte membrane for fuel cells according to an exemplary embodiment of the present invention includes the second ionomer dispersion including the catalyst for decomposing peroxide, the polymer electrolyte membrane may include a plurality of reinforcement films having different thicknesses. Preferably, the position of the second ionomer layer may be adjusted by adjusting the thickness of the first reinforcement film or the second reinforcement film, for example, using first or second reinforcement films having different thicknesses or using a plurality of first and/or second reinforcement films.

Therefore, the polymer electrolyte membrane for fuel cells according to an exemplary embodiment of the present invention employs the ionomer layer including the catalyst for decomposing peroxide, which may prevent gas crossover, thus being advantageous in that it may minimize performance degradation due to gas crossover, prevent an electrical short in the electrolyte membrane, and make it easy to adjust the position of the ionomer layer in the electrolyte membrane in the thickness direction so as to effectively mitigate gas crossover.

In the manufacturing of the multilayer membrane by forming the third ionomer layer by applying the third ionomer dispersion to the second reinforcement film (S50), the multilayer membrane in which the first ionomer layer, the first reinforcement film, the second ionomer layer, the second reinforcement film and the third ionomer layer are sequentially disposed or stacked is finally manufactured by forming the third ionomer by applying the third ionomer dispersion to the second reinforcement film.

The third ionomer is not limited to a specific ionomer as long as it serves as a binder which fixes the electrode and the second reinforcement film and serves as a transport path which may transport protons generated by the anode to the cathode. The third ionomer dispersion may be a dispersion in which an ionomer in powder form is sufficiently dispersed in a solvent, the ionomer may be a conventional ionomer which may be used in the present invention, and components included in the ionomer of the third ionomer dispersion are the same as or different from components included in the first ionomer.

Further, the glass transition temperature $T_g$ of the third ionomer included in the third ionomer layer may be lower than the glass transition temperature $T_g$ of the second ionomer included in the second ionomer layer, in the same manner of the glass transition temperature $T_g$ of the first ionomer. When the membrane electrode assembly for fuel cells is finally manufactured by disposing (stacking) the electrolyte membrane according to an exemplary embodiment of the present invention and the electrodes and then performing hot-pressing, in order to increase interfacial adhesion between the electrodes and the electrolyte membrane, hot-pressing must be performed at a temperature higher than the glass transition temperatures of the ionomers adjacent to the interfaces between the electrodes and the electrolyte membrane. Therefore, when the glass transition temperature of the ionomer located on the outer surface of the electrolyte membrane is low, the interfacial adhesion between the electrode and the electrolyte membrane may be improved, and thus, performance degradation due to electrode detachment may be mitigated. Moreover, the thermal bonding temperature may be lowered, and thus, damage to the electrode due to heat and performance reduction due to excessive crystallization of the ionomer and thermal degradation may be prevented.

A method for applying the third ionomer dispersion according to an exemplary embodiment of the present invention to the second reinforcement film may be the same as or different from the method for applying the first ionomer dispersion to the support film.

The coating thickness of the third ionomer dispersion may be of about 20 to 500 μm, or particularly of about 50 to 200 μm. When the coating thickness of the third ionomer dispersion is less than about 20 μm, the thickness of the third ionomer layer may be excessively small and thus reduce adhesion between the electrolyte membrane and the electrode. Further, when the coating thickness of the third ionomer dispersion is greater than about 500 μm, the coated ionomer dispersion may flow without maintaining the shape thereof. Moreover, the thickness of the electrolyte membrane is increased, and thus performance of the fuel cell may be reduced due to an increase in ionic resistance of the electrolyte membrane.

In the drying of the multilayer membrane (S60), the multilayer membrane formed by sequentially disposing (stacking) the first ionomer layer, the first reinforcement film, the second ionomer layer, the second reinforcement film and the third ionomer layer may be dried, and the support film may be removed.

When the solvents included in the ionomer dispersions are removed by drying the multilayer membrane, crystallinity of the ionomers may be increased and thus mechanical robustness of the ionomers may be improved. The thicknesses of the ionomers may be reduced by drying the multilayer membrane, compared to the coating thicknesses of the ionomer dispersions, that is to say, the thicknesses of the ionomers may be of about 1 to 50 μm. The reduction rate of the coating thickness of the ionomer dispersion may be varied depending on the content of the ionomer in the ionomer dispersion and the kind of the solvent, and thus, the thickness and position of the second ionomer layer may be adjusted by appropriately controlling the content of the ionomer and the kind of the solvent in the ionomer dispersion.

The multilayer membrane may be dried at a temperature of about 60 to 200° C., or particularly, at a temperature of about 80 to 180° C. When the drying temperature of the multilayer membrane is less than about 60° C., the drying time of the multilayer membrane may be excessively increased and thus a process cycle time may be increased. On the other hand, when the drying temperature of the multilayer membrane is greater than about 200° C., thermal decomposition of the ionomers and deformation of the support film excessively occur, and thus, the quality of the electrolyte membrane may be seriously degraded. Further, in some cases, the drying of the multilayer membrane (S50) may be performed in different temperature ranges in stages, and preferably, be performed in two stages. For example, the multilayer membrane may be primarily dried at a temperature of about 60 to 100° C., and then be secondarily dried at a temperature of about 140 to 200° C.

A drying process may be additionally performed immediately after Operation S20 and Operation S40. The drying process may be performed at a temperature of about 40 to 100° C., or particularly, at a temperature of about 60 to 85° C. When the drying temperature is less than about 40° C., the drying time may be excessively increased. On the other hand, when the drying temperature of the multilayer membrane is greater than about 100° C., crystallinity of the ionomers is increased and thus interfacial adhesion may be reduced, and there is a difference in crystallinity between the ionomers depending on the number of times of a heat treatment process which is performed and thus quality stability of the multilayer membrane may be degraded.

Polymer Electrolyte Membrane for Fuel Cells

Figure 2:
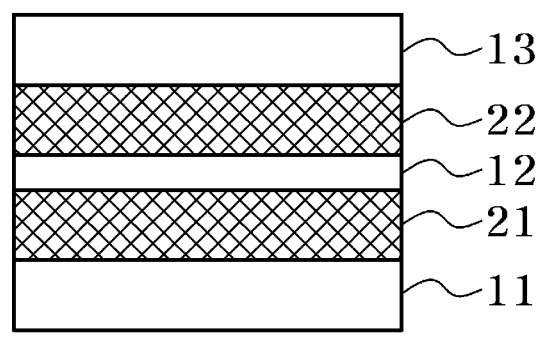
FIG. 2 shows a cross-sectional view schematically illustrating an exemplary polymer electrolyte membrane for fuel cells according to an exemplary embodiment of the present invention.

FIG. 2 shows a cross-sectional view schematically illustrating an exemplary polymer electrolyte membrane for fuel cells according to an exemplary embodiment of the present invention. The polymer electrolyte membrane for fuel cells includes a first ionomer layer 11, a first reinforcement film 21 disposed on the first ionomer layer 11, a second ionomer layer 12 disposed on the first reinforcement film 21, a second reinforcement film 22 disposed on the second ionomer layer 12, and a third ionomer layer 13 disposed on the second reinforcement film 22. In this embodiment, these layers and films 11, 21, 12, 22 and 13 may be stacked in the order listed in the thickness direction.

Components included in the first ionomer layer 11, the first reinforcement film 21, the second ionomer layer 12, the second reinforcement film 22 and the third ionomer layer 13 and features thereof may be the same as or different from those in the above-described manufacturing method. In the polymer electrolyte membrane for fuel cells according to an exemplary embodiment of the present invention, the first reinforcement film 21 and the second reinforcement film 22 may have the same specifications. Further, the first or the second reinforcement films 21 and 22 may have a thickness of about 1 to 20 μm, or particularly of about 3 to 15 μm. When the thickness of the reinforcement film is less than about 1 μm, mechanical strength improvement effects of the electrolyte membrane may be insignificant. On the other hand, when the thickness of the reinforcement film is greater than about 20 μm, it may be difficult for the reinforcement film to be sufficiently impregnated with the ionomer dispersion, and thus, performance of a fuel cell may be reduced due to an increase in ionic resistance of the electrolyte membrane.

Further, the same ionomer dispersion may be used to form the first ionomer layer 11, the second ionomer layer 12 and the third ionomer layer 13, and the polymer electrolyte membrane may be configured such that the first ionomer layer 11 and the third ionomer layer 13 are symmetrical in the thickness direction about the second ionomer layer 12. The first, second or third ionomer layer 11, 12 or 13 may have a thickness of about 1 to 50 μm, or particularly of about 2 to 20 μm. When the thickness of the ionomer layer is less than about 1 μm, interfacial adhesion between the ionomer layer and an electrode or the adjacent reinforcement film may be reduced and thus cause performance degradation due to detachment. On the other hand, when the thickness of the ionomer layer is greater than about 50 μm, the thickness of the electrolyte membrane is increased, and thus performance of the fuel cell may be reduced due to an increase in ionic resistance of the electrolyte membrane.

The polymer electrolyte membrane for fuel cells according to an exemplary embodiment of the present invention may include a plurality of reinforcement films, and preferably, include a plurality of porous reinforcement films. Therefore, the polymer electrolyte membrane for fuel cells according to an exemplary embodiment of the present invention may have excellent mechanical stiffness and improved physical durability compared to a conventional electrolyte membrane including one porous reinforcement film layer. Moreover, rolling of the electrolyte membrane due to a difference in shrinkage and swelling between the two surfaces of the electrolyte membrane is mitigated, and thus, the ease of handling of the electrolyte membrane may be improved when a membrane electrode assembly is manufactured.

Figure 3:
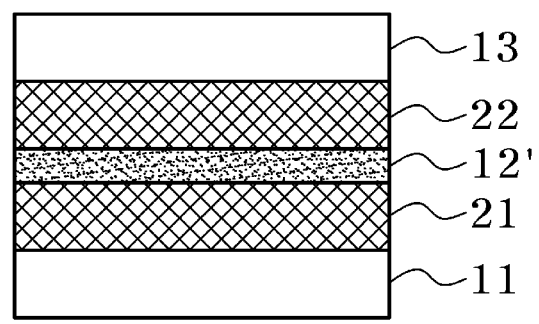
FIG. 3 shows a cross-sectional view schematically illustrating an exemplary polymer electrolyte membrane for fuel cells according to an exemplary embodiment of the present invention.

FIG. 3 shows a cross-sectional view schematically illustrating an exemplary polymer electrolyte membrane for fuel cells according to another embodiment of the present invention. The polymer electrolyte membrane for fuel cells includes a first ionomer layer 11, a first reinforcement film 21 disposed on the first ionomer layer 11, a second ionomer layer 12' disposed on the first reinforcement film 21, a second reinforcement film 22 disposed on the second ionomer layer 12, and a third ionomer layer 13 disposed on the second reinforcement film 22. These layers and films 11, 21, 12', 22 and 13 may be stacked in the order listed in the thickness direction.

Here, the second ionomer layer 12' may include a catalyst for decomposing peroxide, and the catalyst for decomposing peroxide may include one or more selected from the group consisting of a catalytic metal and a supported catalyst in which the catalytic metal is supported on a carbon-based carrier. Further, a method for forming the second ionomer layer 12' of the polymer electrolyte membrane for fuel cells according to an exemplary embodiment of the present invention may be the same as or different from that in the above-described manufacturing method.

Components included in the first ionomer layer 11, the first reinforcement film 21, the second ionomer layer 12', the second reinforcement film 22 and the third ionomer layer 13 and the features thereof may be the same as or different from those in the above-described polymer electrolyte membrane for fuel cells according to one embodiment of the present invention.

The polymer electrolyte membrane for fuel cells according to an exemplary embodiment of the present invention includes the catalyst for decomposing peroxide in the second ionomer layer 12' and thus minimizes mobility of the catalyst for decomposing peroxide, thereby minimizing performance degradation due to gas crossover and preventing an electrical short in the electrolyte membrane.

Figure 4A:
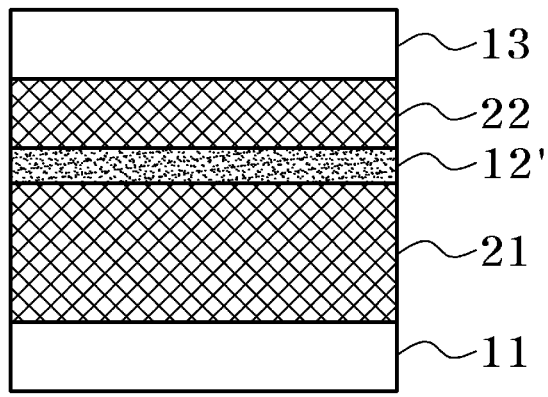
FIGS. 4A and 4B show cross-sectional views schematically illustrating exemplary first and second reinforcement films having different thicknesses in an exemplary polymer electrolyte membrane for fuel cells according to an exemplary embodiment of the present invention.
Figure 4B:
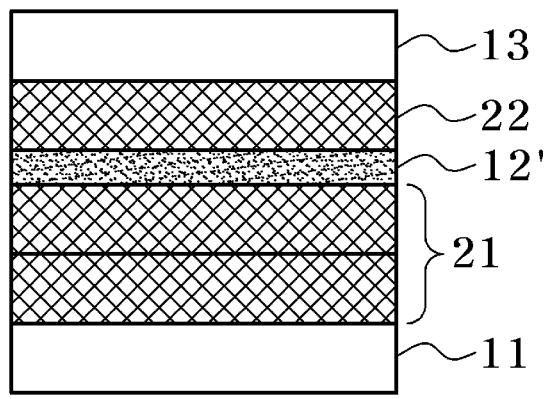

FIGS. 4A and 4B are cross-sectional views schematically illustrating exemplary first and second reinforcement films having different thicknesses in an exemplary polymer electrolyte membrane for fuel cells according to an exemplary embodiment of the present invention. The polymer electrolyte membrane for fuel cells may be the same as the polymer electrolyte membrane for fuel cells according to the earlier embodiment shown in FIG. 3, except that the thicknesses of the first and second reinforcement films 21 and 22 are different. That is, the first reinforcement film 21 and the second reinforcement film 22 having different thicknesses may be used, and the thickness of the first reinforcement film 21 may be greater than the thickness of the second reinforcement film 22. However, the first and second reinforcement films 21 and 22 are not limited thereto, and the thickness of the second reinforcement film 22 may be greater than the thickness of the first reinforcement film 21.

In this case, a conventional method which may be used by those skilled in the art so as to adjust the thickness of a porous reinforcement film layer may be used, for example, a first reinforcement film 21 and a second reinforcement film 22 having different thicknesses may be used (in FIG. 4A), or a plurality of reinforcement films 22 may be stacked (in FIG. 4B), without being limited thereto.

The thicknesses of the first and second reinforcement films 21 and 22 may be 1-20 μm. Preferably, the thickness of the first reinforcement film 21 may be of about 1 to 20 μm and the thickness of the second reinforcement film 22 may be of about 1 to 10 μm.

A second ionomer layer 12' is located in an area of the electrolyte membrane, in which peroxide is mainly produced, through the above thickness adjustment. When the second ionomer layer 12' is located too far from this area, chemical degradation mitigation effects by the catalyst for decomposing peroxide may be reduced. Here, this position of the second ionomer layer 12' may be varied depending on the structure of the fuel cell stack and the operating condition of the fuel cell stack.

That is, the polymer electrolyte membrane for fuel cells according to an exemplary embodiment may make it easy to adjust the position of the second ionomer layer 12' serving to block gas crossover by adjusting the thicknesses of the reinforcement films 21 and 22, and thus be advantageous in that it effectively mitigates gas crossover.

Each of porosities of the first and second reinforcement films may be of about 50 to 95%. When the porosities are less than about 50%, movement passages of protons are reduced, and thereby, ionic resistance of the electrolyte membrane may be increased and thus performance of the fuel cell may be lowered. On the other hand, when the porosities is greater than about 95%, improvement in the mechanical strength of the electrolyte membrane may be insignificant.

Figure 5:
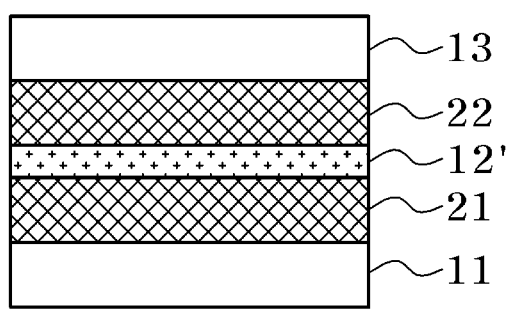
FIG. 5 shows a cross-sectional view schematically illustrating exemplary first to third ionomer layers having different transition temperatures $T_g$ in an exemplary polymer electrolyte membrane for fuel cells according to an exemplary embodiment of the present invention.

FIG. 5 shows a cross-sectional view schematically illustrating exemplary first to third ionomer layers having different glass transition temperatures $T_g$ in a polymer electrolyte membrane for fuel cells according to an exemplary embodiment of the present invention. The polymer electrolyte membrane for fuel cells may be the same as the polymer electrolyte membrane for fuel cells according to the earlier embodiment shown in FIG. 3, except that the glass transition temperatures $T_g$ of the first to third ionomer layers 11, 12' and 13 are different.

The first to third ionomer layers 11, 12' and 13 may have different glass transition temperatures $T_g$ using a conventional method which may be used in the present invention by those skilled in the art, without being limited to a specific method. The glass transition temperatures $T_g$ of the first ionomer and the third ionomer included in the first ionomer layers 11 and 13 located on the outer surface of the electrolyte membrane may be less than the glass transition temperature $T_g$ of the second ionomer included in the second ionomer layer 12 located inside the electrolyte membrane. In general, the electrolyte membrane and electrodes are stacked and then hot-pressing is performed, thereby manufacturing a membrane electrode assembly for fuel cells (not shown). In order to increase interfacial adhesion between the electrodes and the electrolyte membrane, hot-pressing must be performed at a temperature higher than the glass transition temperatures of the ionomers adjacent to the interfaces between the electrodes and the electrolyte membrane. Therefore, when the glass transition temperature of the ionomer located on the outer surface of the electrolyte membrane is low, the interfacial adhesion between the electrode and the electrolyte membrane may be improved, and thus, performance degradation due to electrode detachment may be mitigated. Moreover, a thermal bonding temperature may be lowered, and thus, damage to the electrodes due to heat and performance reduction due to excessive crystallization of the ionomers and thermal degradation may be prevented.

The polymer electrolyte membrane for fuel cells according to various exemplary embodiments of the present invention may include a plurality of porous reinforcement films, and may thus have excellent mechanical stiffness and greatly improved physical durability. Further, the polymer electrolyte membrane for fuel cells according to various exemplary embodiments of the present invention may employ the ionomer layer including the catalyst for decomposing peroxide, which may block gas crossover therein, and may thus minimize performance degradation due to gas crossover and prevent an electrical short in the electrolyte membrane, and the polymer electrolyte membrane for fuel cells makes it easy to adjust the position of the ionomer layer in the electrolyte membrane in the thickness direction and may thus effectively mitigate gas crossover. Further, the polymer electrolyte membrane for fuel cells according to various exemplary embodiments of the present invention may include the ionomer layers including the ionomers having low glass transition temperatures on the outer surfaces of the electrolyte membrane, and may thus improve interfacial adhesion between the electrodes and the electrolyte membrane. Moreover, the polymer electrolyte membrane for fuel cells according to various exemplary embodiments of the present invention may improve durability of the fuel cell stack using a comparatively simple method and thus achieve cost reduction and marketability improvement.

As is apparent from the above description, a method for manufacturing a polymer electrolyte membrane for fuel cells according to various exemplary embodiments of the present invention, in which a plurality of porous reinforcement films and ionomer layers are continuously stacked, may shorten the number of process steps and a process time and thus increase process efficiency. Further, a polymer electrolyte membrane for fuel cells manufactured by the method according to various exemplary embodiments of the present invention includes a plurality of porous reinforcement films, and may thus have excellent mechanical stiffness and greatly improved physical durability. Further, the polymer electrolyte membrane for fuel cells manufactured by the method according to various exemplary embodiments of the present invention employs an ionomer layer including a catalyst for decomposing peroxide, which may block gas crossover therein, and may thus minimize performance degradation due to gas crossover and prevent an electrical short in the electrolyte membrane, and the polymer electrolyte membrane for fuel cells makes it easy to adjust the position of the ionomer layer in the electrolyte membrane in the thickness direction and may thus effectively mitigate gas crossover. Further, the polymer electrolyte membrane for fuel cells manufactured by the method according to various exemplary embodiments of the present invention includes ionomer layers including ionomers having low glass transition temperatures on the outer surfaces of the electrolyte membrane, and may thus improve interfacial adhesion between electrodes and the electrolyte membrane. Moreover, the polymer electrolyte membrane for fuel cells manufactured by the method according to various exemplary embodiments of the present invention may improve durability of a fuel cell stack using a comparatively simple method and thus achieve cost reduction and marketability improvement.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a polymer electrolyte membrane for fuel cells, the method comprising:

forming a first ionomer layer by applying a first ionomer dispersion;

disposing a first reinforcement film on the first ionomer layer;

forming a second ionomer layer by applying a second ionomer dispersion to the first reinforcement film;

disposing a second reinforcement film on the second ionomer layer;

forming a third ionomer layer by applying a third ionomer dispersion to the second reinforcement film, thereby forming a multilayer membrane comprising the first ionomer layer, the first reinforcement film, the second ionomer layer, the second reinforcement film, and the third ionomer layer; and drying the multilayer membrane, wherein the second ionomer layer comprises a catalyst for decomposing peroxide, wherein a position of the second ionomer layer is adjusted by controlling thicknesses of the first reinforcement film or the second reinforcement film, wherein the thickness of the first reinforcement film or the second reinforcement film is controlled by using a plurality of first reinforcement films or second reinforcement films, the thickness of the first reinforcement film is 1 to 20 μm and the thickness of the second reinforcement film is 1 to 10 μm, the first reinforcement film and the second reinforcement film each consists of one or more selected from the group consisting of polytetrafluoroethylene (PTFE), poly(ethylene terephthalate) (PET), polybenzoxazole (PBO), polyethylene (PE), polypropylene (PP) and polyimide (PI), wherein glass transition temperatures of the first ionomer and the third ionomer are less than a glass transition temperature of the second ionomer, and wherein the disposing the first reinforcement film, the forming the second ionomer layer and the disposing the second reinforcement film are continuously performed without drying.

2. The method of claim 1, wherein the disposing the first reinforcement film, the forming the second ionomer layer and the disposing the second reinforcement film are continuously performed.

3. The method of claim 1, wherein the catalyst for decomposing peroxide comprises one or more selected from the group consisting of a catalytic metal and a supported catalyst in which the catalytic metal is supported on a carbon-based carrier.

4. The method of claim 1, wherein the second ionomer layer is located in an area, in which peroxide is produced, by controlling the thicknesses.

5. The method of claim 1, wherein each of coating thicknesses of the first, second and third ionomer dispersions is about 20 to 500 μm.

6. The method of claim 1, wherein each of porosities of the first and second reinforcement films is 50-95%.

7. The method of claim 1, wherein, in the drying the multilayer membrane, the multilayer membrane is dried at a temperature of about 60 to 200° C.

* * * * *